Patented Sept. 16, 1947

2,427,562

UNITED STATES PATENT OFFICE 2,427,562

CEREAL STARCH ADHESIVE

Carl C. Kesler and David Rankin, Cedar Rapids, Iowa, assignors to Penick & Ford, Ltd., Incorporated, Cedar Rapids, Iowa, a corporation of Delaware No Drawing. Application August 22, 1942, Serial No. 455,706

9 Claims. (Cl. 106—211)

This invention relates to a cereal starch adhesive, and more particularly to a cereal starch adhesive which is adapted to be spread on a surface in the form of a thin substantially-continuous film and to be used in the manufacture of veneer plywood boards and the like.

Root starches, such as tapioca starch, for example, have heretofore been widely used in the manufacture of built-up veneer board or plywood. Such a starch has certain desirable properties for this use which have not been heretofore obtainable in cereal starches. If tapioca starch is cooked in a 30% concentration with 4% sodium hydroxide, for example, a viscous tacky material is obtained which possesses a desired viscosity and body and good adhesive powers. Such a tapioca starch adhesive is easy to handle mechanically in a range of temperature from 90–150° F., in that the adhesive flows readily, spreads readily on mechanical roll spreaders, and transfers well to veneer wood sheets.

In an adhesive which is to be used for the purpose of securing layers of board or wood together or for a similar purpose in connection with the forming of laminated fiber boxes and the like, it is important that the liquid adhesive flow readily and spread readily, when applied to a surface, to form a thin substantially-continuous film. The adhesive should possess a considerable amount of tackiness and stringiness which arises from the cohesive properties of the material. Cereal starches, such as corn starch, have been used for this purpose only when the starch has undergone extensive modification, and the untreated starch or the less extensively modified starch heretofore has had but a limited application in this field. We use the term cereal starch herein to mean an untreated cereal starch or a cereal starch which has been treated in any of the commonly employed methods in the manufacture of starch products, but the modification is effected only to the extent that the cereal starch product still retains a pronounced tendency to gel on cooling after being cooked with water in the usual commercial concentrations employed by the makers of veneer board and the like, which gel substantially prevents the use of such an adhesive product in the desired temperature range of 90–150° F. The gel formation is a serious problem in cereal starches for it hinders the use of such a liquid adhesive or glue in the common mechanical type of spreader. Moreover, an untreated corn starch, when used as such an adhesive, requires a higher ratio of water to starch in forming the liquid adhesive and a higher concentration of sodium hydroxide. When large quantities of water are used, it tends to introduce an excessive amount of water into the finished board. The high concentration of sodium hydroxide promotes staining in some types of veneer wood and is definitely disadvantageous.

It has been known that the addition of a soap to a cereal starch adhesive would inhibit the gel formation. Apparently, the gel structure of any untreated or slightly modified starch product, cooked with alkali, is modified by the formation of complex molecules or complex associations with the soap or similar compound. However, the adhesive product to which the soap has been added does not exhibit the tackiness or stringiness which is necessary and desirable in vegetable glues, the glue instead being of an objectionable salve-like character. Such a product is also unsuitable for use in the forming of plywood boards and the like because of its lack of cohesive power.

The present invention contemplates an alkaline, gelatinized cereal starch adhesive wherein the starch is treated with a soap or similar compound to inhibit the gel, and with a metallic salt or other material which, in the present invention, serves to prevent the destruction by the soap of the tack or string of the adhesive. The soap or gel-inhibiting compound and the metallic salt are added during the cooking operation, either before or after gelatinization of the starch takes place. When the metallic salt is added to the starch, it is found that the further addition of the soap for inhibiting the gel formation does not appreciably affect the cohesiveness of the mixture when the soap and salt are used in the proportions contemplated in the invention.

The invention is applicable to any type of cereal starch, but is particularly suited for use in connection with corn starch which, when treated in accordance with the invention, is a particularly desirable adhesive material. The starch is mixed with water according to the ratio of between 2 and 4.5 parts of water to each part of starch, the proportions being by weight. On cooking, this produces a fluid mixture of the desired body and viscosity and possessing desirable flow characteristics.

The starch should be treated with an alkali in the conventional manner, the proportion of alkali being sufficiently small that the stain on the wood products to which the adhesive is applied does not occur. The alkali is very important in the present invention in connection with the use of a metallic compound for preventing the destruction of the cohesiveness of the starch adhesive by the addition of the soap. The metallic compound used for this purpose is effective in the presence of alkali wherein the metallic compound is converted to the hydroxide, oxide or amphoteric ion. The alkali is also helpful in improving the dispersion qualities of the starch adhesive, and in the case of the application of the adhesive to a wood surface is of some value in improving the bond of the adhesive. Preferably, the alkali is present in an amount between 2% and 5% by weight of the dry starch used, although any suitable proportion of alkali may be used. Sodium hydroxide or any of the other well-known alkalies may be used as the alkali compound.

The material for inhibiting the gel formation is preferably a relatively long chain, aliphatic, bipolar, organic compound, such as the sodium soap of stearic, lauric, myristic, palmitic, or oleic acid, or a mixture of these soaps. Water-dispersible, long chain, aliphatic, organic compounds may be used with a considerable degree of success. For example, long chain, fatty alcohol sulfates are suitable for this purpose. In addition to the soaps and the long chain, fatty alcohol sulfates, long chain, aliphatic fatty acids may be used. The organic compounds may be saturated or unsaturated.

With the soap which is added to the aqueous alkaline starch should be used a suitable metallic salt or other metallic compound for increasing the cohesiveness or tack or string of the starch. It has been found that when such an ingredient is added to the starch, the soap, although inhibiting the gel formation, does not, in the proportions used, decrease the tackiness of the adhesive. Any suitable metallic compound may be used for this purpose. Salts of amphoteric metals, such as aluminum, zinc, chromium, and tin have been found to be particularly desirable. Arsenic and antimony compounds are also effective. Also, metals, such as copper, which are found in more than one valence, are suitable. In the case of such metals, the salt is added with the metal in the form of the ion of the higher valence. Thus, in the case of copper salts, the salts are preferably added as cupric salts. Since cupric oxide and hydroxide are dissolved by chemical reaction with either an acid or a base, copper in the cupric form may be considered as amphoteric. Although the metals will normally be used in the form of salts, any compound may be used in which the metal is present in the ionic form and is converted in the alkaline solution to the hydroxide or oxide or amphoteric ion.

Any suitable negative ion may be used in the metallic salt which is to be added since the metallic salt is converted to the hydroxide by reaction with the alkali in the starch solution. Metals which form insoluble hydroxides in a neutral aqueous solution have been found to be effective in varying degrees for the purpose of invention. The salts of the alkali metals which form soluble hydroxides do not accomplish the desired purpose. Similarly, the compounds of the alkaline earth metals which form slightly-soluble hydroxides are not desirable for this purpose. Although the metal should be one which forms a substantially-insoluble hydroxide in a neutral aqueous solution, the hydroxide, oxide or amphoteric ion which is formed in an alkaline solution should be at least very slightly-soluble so as to permit the same to enter into a reaction with the starch.

The material increasing the tackiness of the adhesive and the material for inhibiting the gel formation may be added in any suitable proportions. These proportions will vary according to the different ingredients which are used and the quantities of each. Preferably, the soap is used in a quantity between 0.3% and 5% by weight of the dry starch used, while the metallic salt is used in a quantity between 0.10% and 5% by weight of the dry starch used. With different soaps, it will be found that the desired quantity of the metallic salt will vary somewhat, while with changes in the salt used the proportion of soap will also be varied. Moreover, the amount of soap and metallic compound used are varied with the degree of modification of the starch. However, it is a relatively simple matter to determine the desirable or optimum quantities of each of these ingredients for any particular adhesive composition.

The following are specific examples of compositions which have been found to be very satisfactory:

Example 1

| | Pounds |
|---|---|
| Untreated corn starch | 100 |
| Water | 425 |
| Sodium hydroxide | 4 |
| Copper sulphate hydrated | 0.5 |
| Soap | 1 |

Example 2

| | Pounds |
|---|---|
| Thin boiling corn starch | 100 |
| Water | 250 |
| Sodium hydroxide | 4.3 |
| Soap | 0.75 |
| Aluminum sulfate hydrated | 2.2 |

Example 3

| | Pounds |
|---|---|
| Untreated corn starch | 100 |
| Water | 425 |
| Sodium aluminate | 1.5 |
| Soap | 1.75 |
| Sodium hydroxide | 3.75 |

Example 4

| | Pounds |
|---|---|
| Thin boiling corn starch | 100 |
| Water | 300 |
| Copper sulfate hydrated | 1.0 |
| Soap | 0.5 |
| Sodium hydroxide | 3 |

The order of the addition of the soap and the salt to the corn starch may be varied by adding these compounds to the dry starch, to the starch-water suspension at the beginning of the cooking operation, or to the gelatinized starch. The chemicals may be added in a powdered dry form if sufficient agitation of the liquid mixture is maintained or, if desired, they may be added in an aqueous medium. The sodium hydroxide is preferably added last, and it may be added to the gelatinized starch containing the chemicals or to the starch-water-chemical suspension. The starch is cooked for a suitable length of time in accordance with conventional practice for corn starch adhesives. The length of time and degree of temperature necessary in cooking operation depends on the type of cooking equipment which is employed. It is found that a temperature of 160° F. to 190° F. is desirable, although this depends on the length of time that the liquid adhesive is subjected to the heat. In the temperature range of 90° F. to 150° F., the glue may be readily applied by a mechanical spreader. At this temperature, the glue varies in color from a light tan to a dark red and exhibits a tacky or stringy nature. No gel formation is found.

The improved adhesive may be prepared in any suitable type of equipment, preferably in a heated, stirred container. It has been found that the cooking equipment commonly employed in the industrial preparation of vegetable glues is satisfactory for this purpose.

When aliphatic, long chain soaps, fatty acids, or fatty alcohol sulfates are added to an alkaline starch paste, it is probable that a complex is formed which prevents the hydration normally expected in a slightly-modified cereal starch paste and/or the combination through association of two adjacent chains of the complicated starch molecule. The result of the formation of this complex is the destruction of the organized gel structure in the alkaline starch paste. The resulting material exhibits a "short" character, the viscosity of the material probably being due to the friction of relatively small molecular aggregates against one another rather than the complex association found in the normal cooked cereal starch gel. When, in addition, a metallic derivative, such as aluminum or copper salt, is added to the alkaline cereal starch mixture, the hydroxide of the metal is formed. The metallic hydroxide may unite with the alkali metal alcoholate groups of the discrete soap-starch complex molecules to form inter- and intra-molecular bonds.

The formation of inter- and intra-molecular bonds may impart to the soap-starch complex a new interlocked nature which is affected by the amount of metallic salt added to the mixture. As a result, the desirable "tacky or stringy" character desirable in vegetable adhesives is obtained, and the presence of the soap in this combination prevents the normal association of the cereal starch chains which would lead to the formation of the undesirable highly organized gel structure. Although this theory may explain the action of the combination of the soap and metallic salt in the cereal starch adhesive, we do not wish to be limited or bound by it. At any rate, without regard to the theory of the reaction, it has been found that the presence of the metallic salt in the aqueous, alkaline, gelatinized starch adhesive prevents the soap from decreasing the tackiness or stringiness of the starch, even though the gel formation is inhibited.

Although the improved adhesive composition has been described specifically for the purpose of illustration, it will be apparent that many modifications and changes may be made without departing from the spirit and scope of the invention.

We claim:

1. A starch adhesive composition adapted to be readily spread on a surface in the form of a thin substantially-continuous film, comprising a gelatinized cereal starch in an aqueous alkali medium, a compound of an amphoteric metal for increasing the cohesiveness of the starch, and a water-dispersible aliphatic long chain bi-polar organic compound.

2. A starch adhesive composition adapted to be readily spread on a surface in the form of a thin substantially-continuous film, comprising a gelatinized cereal starch in an aqueous alkali medium, a compound of an amphoteric metal which forms a substantially-insoluble hydroxide in neutral aqueous solution and which forms an oxide, hydroxide or amphoteric ion which is at least slightly-soluble in an aqueous alkaline solution, and a water-dispersible aliphatic long chain bi-polar organic compound.

3. A liquid starch adhesive adapted to be spread on a surface in the form of a thin substantially-continuous film, comprising a gelatinized cereal starch in an aqueous alkali medium, a water-soluble compound of an amphoteric metal for increasing the cohesiveness of the starch, and a water dispersible aliphatic long chain organic compound.

4. A liquid starch adhesive adapted to be spread on a surface in the form of a thin substantially-continuous film, comprising a gelatinized cereal starch in an aqueous alkali medium, a salt of an amphoteric metal, and a water-dispersible soap of a long chain fatty acid.

5. A liquid starch adhesive adapted to be spread on a surface in the form of a thin substantially-continuous film, comprising a gelatinized cereal starch in an aqueous alkaline medium containing between 0.10% and 5% of a compound of an amphoteric metal adapted to increase the cohesiveness of the starch, and between 0.3% and 5% of a water-dispersible soap of a long chain fatty acid, said proportions being by weight with respect to the quantity of dry starch.

6. A liquid starch adhesive adapted to be spread on a surface in the form of a thin substantially-continuous film, comprising approximately 100 parts of a gelatinized cereal starch, between 200 and 450 parts of water, between 2 and 5 parts of an alkali compound, between 0.25 and 5 parts of an aluminum salt, adapted to increase the cohesiveness of the starch, and between 0.3 and 5 parts of a soap of a long chain fatty acid, said proportions being by weight.

7. A liquid starch adhesive adapted to be spread on a surface in the form of a thin substantially-continuous film, comprising a gelatinized cereal starch in an aqueous alkali medium, a cupric compound for increasing the cohesiveness of the starch, and an aliphatic long chain water-dispersible organic compound.

8. A liquid starch adhesive adapted to be spread on a surface in the form of a thin substantially-continuous film, comprising a gelatinized cereal starch in an aqueous alkali medium, a cupric compound for increasing the cohesiveness of the starch, and a water-dispersible soap of a long chain fatty acid.

9. A liquid starch adhesive adapted to be spread on a surface in the form of a thin substantially-continuous film, comprising approximately 100 parts of a cooked, raw or modified cereal starch, between 200 and 450 parts of water, between 2 and 5 parts of an alkali compound, approximately one-half part of a water-dispersible soap of a long chain fatty acid, and approximately one part of a cupric salt, the proportions being by weight.

CARL C. KESLER.
DAVID RANKIN.

REFERENCES CITED

The following references are of record in the file of this patent:

UNITED STATES PATENTS

| Number | Name | Date |
|---|---|---|
| 2,348,685 | Smith | May 9, 1944 |
| 2,280,699 | Grant et al. | Apr. 21, 1942 |
| 2,283,044 | Caesar | May 12, 1942 |
| 2,102,937 | Bauer | Dec. 21, 1937 |
| 2,056,104 | Hueter | Sept. 29, 1936 |
| 1,983,730 | Beyer | Dec. 11, 1934 |
| 1,490,309 | Birk | Apr. 15, 1924 |
| 1,248,039 | Tunnell | Nov. 27, 1917 |

FOREIGN PATENTS

| Number | Country | Date |
|---|---|---|
| 468,582 | Great Britain | July 8, 1937 |